United States Patent
Maree et al.

(10) Patent No.: US 8,557,124 B2
(45) Date of Patent: Oct. 15, 2013

(54) TREATMENT OF WATER

(75) Inventors: Johannes Philippus Maree, Pretoria (ZA); Wynand Jacobus Louw, Pretoria (ZA)

(73) Assignee: Tshwane University of Technology, Arcadia (ZA)

( * ) Notice: Subject to any disclaimer, the term of this patent is extended or adjusted under 35 U.S.C. 154(b) by 91 days.

(21) Appl. No.: 13/051,616

(22) Filed: Mar. 18, 2011

(65) Prior Publication Data
US 2011/0233139 A1  Sep. 29, 2011

(30) Foreign Application Priority Data
Mar. 25, 2010 (ZA) .................. 2010/02127

(51) Int. Cl.
*B03D 3/00* (2006.01)
*C02F 1/52* (2006.01)

(52) U.S. Cl.
USPC ........... 210/726; 210/702; 210/710; 210/723; 210/738; 210/749; 210/767; 210/768; 210/800; 210/804

(58) Field of Classification Search
None
See application file for complete search history.

(56) References Cited

U.S. PATENT DOCUMENTS

| | | | | |
|---|---|---|---|---|
| 3,547,579 A | * | 12/1970 | Pechenick et al. | 423/157 |
| 3,574,530 A | * | 4/1971 | Milliken et al. | 423/243.03 |
| 3,653,829 A | * | 4/1972 | Gelblum | 423/144 |
| 3,929,468 A | * | 12/1975 | Siemens et al. | 75/400 |
| 3,932,584 A | * | 1/1976 | Asakusa et al. | 423/234 |
| 4,211,646 A | * | 7/1980 | Westbrook et al. | 210/631 |
| 4,388,182 A | * | 6/1983 | Hudson | 209/17 |
| 4,655,928 A | * | 4/1987 | Milton et al. | 210/651 |
| 4,695,378 A | * | 9/1987 | Ackman et al. | 210/198.1 |
| 5,698,107 A | * | 12/1997 | Wurzburger et al. | 210/695 |
| 2003/0082084 A1 | * | 5/2003 | Cort | 423/25 |

FOREIGN PATENT DOCUMENTS

| | | | | |
|---|---|---|---|---|
| CN | 101077771 A | * | 11/2007 | |
| JP | 57078988 A | * | 5/1985 | C02F 1/58 |

* cited by examiner

*Primary Examiner* — Bobby Ramdhanie
*Assistant Examiner* — Benjamin J Behrendt
(74) *Attorney, Agent, or Firm* — The H.T. Than Law Group

(57) ABSTRACT

A process for treating impure water includes adding magnesium hydroxide and/or ammonium hydroxide to the water. This neutralizes the impure water and reacts with dissolved metals in the water. The metals are precipitated as metal hydroxides/oxides, which are removed from the water. Thereafter barium hydroxide is added to the water. The barium hydroxide reacts with dissolved sulphates to produce barium sulphate and, when magnesium hydroxide is used, with dissolved magnesium, to produce magnesium hydroxide. Barium sulphate and, when present, magnesium hydroxide are removed from the water. When ammonium hydroxide is used, ammonia is stripped from the water. Carbon dioxide is then added to the water. The carbon dioxide reacts with dissolved calcium in the water. The calcium is precipitated as calcium carbonate, which is removed from the water.

13 Claims, 1 Drawing Sheet

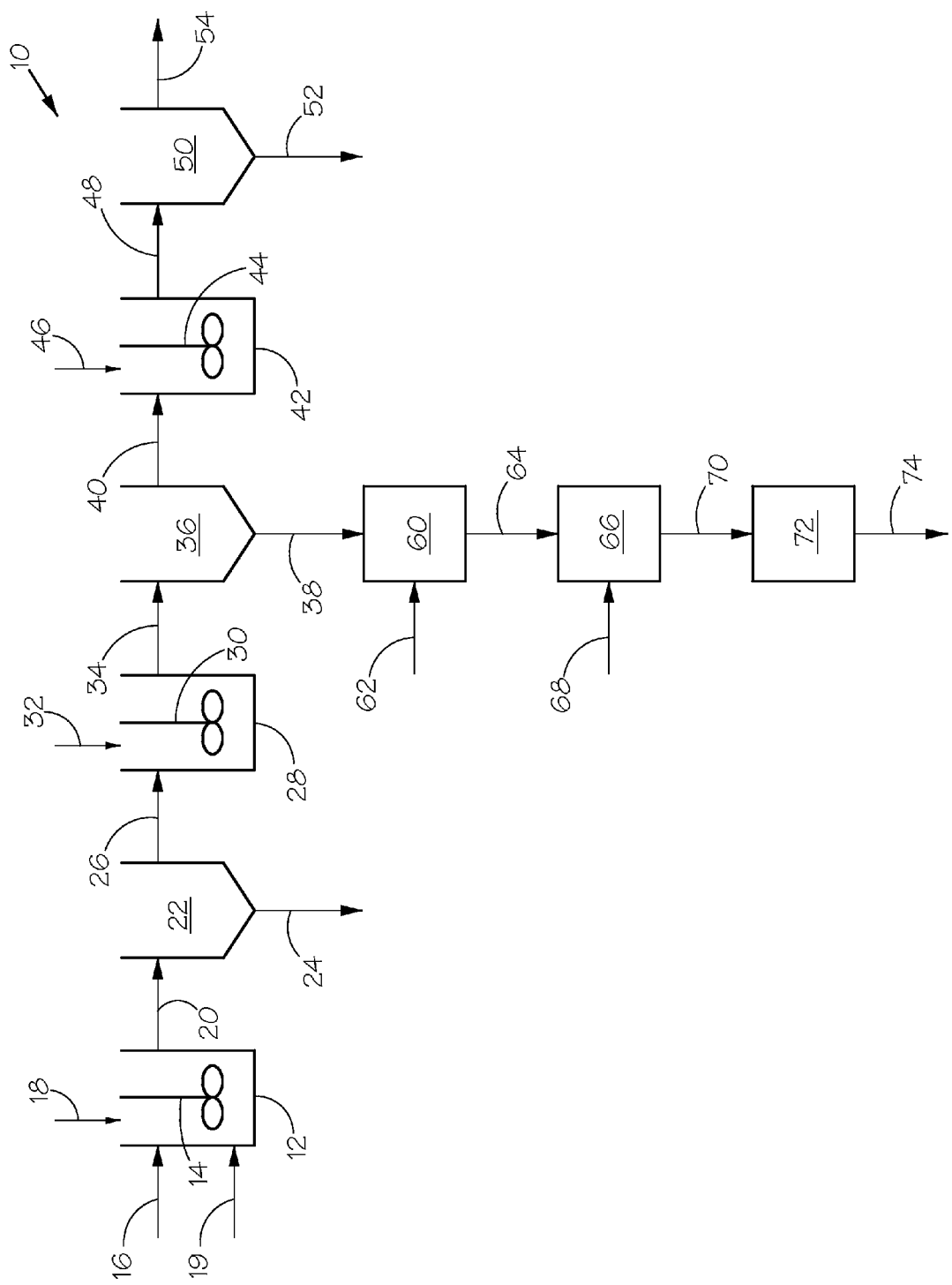

TREATMENT OF WATER

CROSS-REFERENCE TO RELATED APPLICATION

The present application is claims priority under 35 U.S.C. §119 (a)-(d) to South African provisional patent application no. 2010/02127 filed on 25 Mar. 2010, which is incorporated by reference herein in its entirety.

FIELD OF THE INVENTION

THIS INVENTION relates to the treatment of water. It relates in particular to a process for treating impure water containing dissolved metals, calcium and sulphates.

BACKGROUND OF THE INVENTION

In South Africa, vast quantities of mine water are produced through mining operations such as gold and coal mining. These mine waters contain high levels of dissolved metals such as iron, aluminium and manganese, as well as other impurities. The mine waters are typically stored above ground, but seepage into underground voids or cavities takes place continually. At the same time, the mine waters become even more polluted through pyrite oxidation that generates high levels of acidity and dissolved sulphates in accordance with reaction (1):

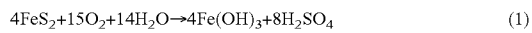

$$4FeS_2 + 15O_2 + 14H_2O \rightarrow 4Fe(OH)_3 + 8H_2SO_4 \qquad (1)$$

The resultant acid mine drainage (AMD) is thus a major contributor to water pollution.

SUMMARY OF THE INVENTION

It is accordingly an object of the invention to provide a process whereby acid mine drainage can be treated cost effectively to remove dissolved metals and sulphates therefrom.

Thus, according to the invention, there is provided a process for treating impure water containing dissolved metals, dissolved calcium, and dissolved sulphates, which process includes in a first treatment stage, adding magnesium hydroxide and/or ammonium hydroxide to the impure water, for neutralization of the impure water and for reaction with dissolved metals in the water, thereby to cause the metals to be precipitated as metal hydroxides or metal oxides;

optionally, in a pretreatment step and/or in the first treatment stage, subjecting the impure water to oxidation treatment thereby to oxidize at least one dissolved metal present in the impure water;

removing precipitated metal hydroxides and metal oxides from the water;

thereafter, in a second treatment stage, adding barium hydroxide to the water, with the barium hydroxide reacting with dissolved sulphates in the water to produce barium sulphate, and, when magnesium hydroxide is used in the first treatment stage, with dissolved magnesium, also to produce magnesium hydroxide;

removing barium sulphate from the water;

removing, when present, magnesium hydroxide from the water;

when ammonium hydroxide is used in the first treatment stage, stripping ammonia from the water;

in a third treatment stage, adding carbon dioxide to the water, with the carbon dioxide reacting with dissolved calcium in the water, to cause the calcium to be precipitated as calcium carbonate; and removing the precipitated calcium carbonate from the water.

The impure water may contain, as a dissolved metal, iron (II). It may also contain iron (III), aluminium (III) and/or manganese (II) as dissolved metal(s). More particularly, the impure water may be acid mine drainage containing, in addition to iron (II) as a dissolved metal, also iron (III), manganese, zinc, nickel, cobalt, aluminium and/or magnesium as dissolved metal(s), possibly together with some radio activity and free acid.

The oxidation treatment may include adding oxygen or air to the impure water ahead of first treatment stage, i.e. in a pretreatment step, or in the first treatment stage, for oxidation of iron (II) to iron (III). In particular, when the impure water is treated with magnesium hydroxide in the first treatment stage, it must also be treated, or pretreated, with air or oxygen for Fe(II) oxidation to Fe(III), in a pH range of 5.0 to 7.5, since magnesium hydroxide will not readily precipitate Fe(II). In the event that ammonium hydroxide is used in the first treatment stage, the oxidation treatment can still be employed beneficially; however, ammonium hydroxide will in any event precipitate at least some Fe(II) as Fe(OH)$_2$. The air addition may comprise aerating the impure water.

In the first treatment stage, the magnesium hydroxide (Mg(OH)$_2$) and/or ammonium hydroxide (NH$_4$OH) thus reacts with the dissolved iron, manganese, aluminium, etc. to cause these metals to be precipitated as metal hydroxides or metal oxides.

Furthermore, in the first treatment stage, any iron (II) present in the impure water is oxidized to iron (III) by the oxygen addition or aeration. Iron (III) is typically precipitated as Fe(OH)$_3$, while manganese (II) can precipitate either as a metal hydroxide, i.e. Mn(OH)$_2$, or as a metal oxide, i.e. Mn$_2$O$_4$. These precipitates are then removed from the water before treatment thereof in the second treatment stage.

When magnesium hydroxide is used in the first treatment stage, the barium sulphate and magnesium hydroxide that are formed in the second treatment stage may be allowed to precipitate out, and may be removed from the water together or simultaneously, e.g. as a sludge. The magnesium hydroxide may thereafter be recovered or separated from the barium sulphate. However, if desired, the precipitated barium sulphate and magnesium hydroxide may be allowed to grow to different sizes, with precipitated barium sulphate then being removed or recovered separately from the precipitated magnesium hydroxide, using the particle size differences of the two precipitated compounds. The magnesium hydroxide that is obtained in the second treatment stage is thus separated from the barium sulphate that is also formed. The magnesium hydroxide that is recovered may be recycled to the first treatment stage. Instead, it can be separated from the barium sulphate after thermal treatment of the barium sulphate/magnesium hydroxide sludge obtained from the second treatment stage, as hereinafter described.

When ammonium hydroxide is used in the first treatment stage, the barium sulphate may be allowed to precipitate out in the second treatment stage, while ammonia may be stripped off at high pH. The ammonia may optionally be reacted with water to obtain ammonium hydroxide which may then be recycled to the first treatment stage.

The process of the invention is thus characterized thereby that the barium hydroxide is used to treat the magnesium hydroxide- or ammonium hydroxide-treated water directly, without the need for pre-removal of magnesium or ammonium ions.

The barium sulphate may be removed from the water as a sludge. The process may then include treating the barium sulphate-containing sludge, either before or after magnesium hydroxide separation therefrom, so as to convert the barium sulphate to barium hydroxide via barium sulphide, either before or after magnesium hydroxide separation therefrom. The conversion of barium sulphate to barium hydroxide may include reacting the barium sulphate with coal, for example, in a furnace, in accordance with reaction (2)

$$BaSO_4 + 2C \rightarrow BaS + 2CO_2 \qquad (2)$$

thereafter reacting the barium sulphide with steam, preferably under pressure, in accordance with reaction (3)

$$BaS + H_2O \rightarrow BaO + H_2S \qquad (3)$$

and thereafter reacting the barium oxide with water, in accordance with reaction (4)

$$BaO + H_2O \rightarrow Ba(OH)_2 \qquad (4)$$

Instead, the barium sulphide may be reacted with sodium hydroxide, to produce barium hydroxide, in accordance with reaction (5)

$$BaS + NaOH + 3H_2O \rightarrow 2Ba(OH)_2 + H_2S + NaHS \qquad (5)$$

The barium hydroxide thus produced can naturally be reused in the second treatment stage.

Typically, reaction (2) may be effected in a kiln such as a shaft kiln, a rotary kiln or a fluidized bed kiln, and the mole ratio of $C:BaSO_4$ may be about 1:3 to cater for heat that is required in reaction (2) which is endothermic.

Coal contains tar and volatile compounds which will contaminate the products of reactions (2), (3), (4) and (5). To avoid such contamination the coal, instead of being used directly in reaction (2), may first converted to coke in accordance with reaction (6)

$$Coal \rightarrow C + CO_2 + ash + volatiles + tar \qquad (6)$$

The resultant coke (C+ash) may then be used, instead of coal, for reaction with barium sulphate in accordance with reaction (2).

Reaction (6) may be carried out in a shaft kiln, which may be the same kiln as that in which reaction (2) is carried out.

Reaction (3) may be carried out by contacting BaS with water, e.g. as steam, under pressure at a high temperature, e.g. 900° C. to 1050° C. By contacting barium sulphide with steam at 950° C. or higher, $H_2S$ is released and barium oxide (BaO) produced. It will be appreciated that barium oxide can be produced as a product i.e. reaction (4) can be omitted, if desired. A pressurized reactor is thus typically used for processing BaS to BaO by reacting it with steam in a stage after the reaction stage.

The steam required for reaction (3) may be introduced into the kiln below the point where air that is required for reaction (2) is introduced into the kiln. In this manner, hydrogen sulphide produced in accordance with reaction (3) may leave the kiln, together with other off-gases produced, at an upper end of the kiln. The process may then include converting the hydrogen sulphide to a sulphur-containing by product, e.g. sulphur(S), NaHS, $H_2SO_4$, etc. Thus, for example, the conversion of the hydrogen sulphide may include contacting the off gases containing the hydrogen sulphide with sodium hydroxide in accordance with reaction (7):

$$NaOH + H_2S \rightarrow NaHS + H_2O \qquad (7)$$

Instead, hydrogen sulphide can be converted to sulphur in accordance with the Clauss process (reaction (8))

$$2H_2S + SO_2 \rightarrow 3S + 2H_2O \qquad (8)$$

The invention will now be described by way of example with reference to the accompanying drawing and the following non-limiting example.

BRIEF DESCRIPTION OF THE DRAWING

In the accompanying drawings, which form a part of the specification and are to be read in conjunction therewith and in which like reference numerals are used to indicate like parts in the various views:

The single drawing shows a simplified flow diagram of a process according to the invention for treating acid mine drainage.

DETAILED DESCRIPTION OF THE PREFERRED EMBODIMENTS

In the drawing, reference numeral 10 generally indicates a process for treating acid mine drainage according to the invention.

The process 10 includes a first treatment stage 12, fitted with stirrer 14, with an acid mine drainage line 16 leading into the stage 12, as do a magnesium hydroxide addition line 18 and an oxygen/air addition line 19.

A water transfer line 20 leads from the first treatment stage 12 to a settler 22. A metal hydroxide/oxide withdrawal line 24 leads from the settler 22 as does a water transfer line 26. The line 26 leads to a second treatment stage 28, fitted with a stirrer 30. A barium hydroxide addition line 32 also leads into the stage 28.

A water transfer line 34 leads from the stage 28 to a settler 36. A solids withdrawal line 38 leads from the stage 36, as does a water transfer line 40.

The water transfer line 40 leads into a third treatment stage 42, fitted with a stirrer 44. A carbon dioxide addition line 46 also leads into the stage 42.

A water transfer line 48 leads from the stage 42 to a settler 50. A treated water line 54 leads from the settler 50, as does a calcium carbonate withdrawal line 52.

The sludge withdrawal line 38 from the stage 36 leads into a shaft kiln 60. A coal addition line 62 leads into the kiln 60. A transfer line 62 leads from the kiln 60 to a pressurized thermal reactor 66. A steam addition line 68 leads into the reactor 66.

A product withdrawal line 70 leads from the stage 66 to a further treatment stage 72, with a product withdrawal line 74 leading from the stage 72.

In use, in the first treatment stage 12, magnesium hydroxide that is added along line 18, serves to neutralize acid mine drainage that is added along the line 16. Furthermore, dissolved metals in the acid mine drainage react with the magnesium hydroxide to cause metals such as iron, aluminium and manganese to be precipitated as metal hydroxides or metal oxides i.e. $Fe(OH)_3$, $Al(OH)_3$ and $MnO_2$. Oxygen or air entering along the line 19 oxidizes Fe(II) to Fe(III).

The metal hydroxide containing water passes to the settler 22 where the metal hydroxides are allowed to settle out, and are withdrawn along the line 24.

The water passes along the line 26 to the second treatment stage 28 where barium hydroxide is added thereto. The barium hydroxide reacts, in the stage 28, with dissolved sulphates in the water, as well as with dissolve magnesium, to produce barium sulphates and magnesium hydroxides.

The water then passes along the line 34 to the settler 36 where the barium sulphide and magnesium hydroxides are allowed to settle out and are withdrawn as sludge along the line 38.

The partially treated water passes along, the line 40 to the third treatment stage 42 where it is contacted with carbon dioxides which enters the stage along the line 46. The carbon dioxide reacts with dissolved calcium in the water, causing calcium carbonate to be precipitated. The calcium carbonate containing water passes along the line 48 into the settler 50. Calcium carbonate is withdrawn along the line 52. Treated water is withdrawn along the line 54.

The sludge that is withdrawn from the settler 36 along the line 38 passes into the shaft kiln 60. Typically, this shaft kiln can have the following dimensions:

Height=4 m; width=1.8 m; length=1.8 m

Instead of a shaft kiln 60, a rotary kiln, a fluidized bed kiln or a tunnel kiln can be used.

In the shaft kiln 60, coal, introduced along the line 62, is first converted to coke in accordance with reaction (6). The coke then reacts with the barium sulphate in accordance with reaction (2), to produce barium sulphide. The barium sulphide passes along the line 64 to the reactor 66, where it is reacted with steam entering along the line 64 in accordance with reaction (3), and at a temperature of 950° C. to 1050° C.

Reaction (3) is thus carried out in a separate reactor (66) in which steam is contacted separately with the barium sulphide in accordance with reaction (3). This unfortunately means that the high energy of the barium sulphide, i.e. reaction (3), is not available for heating the feed air entering the kiln 60; however, since low cost coal can be used in the kiln, this is not perceived to be a major disadvantage.

In order to demonstrate the viability of the process according to the invention, and particularly to show the following:

to demonstrate the metals can be completely removed with $Mg(OH)_2$;

that sulphate concentration can be lowered to less than 200 mg/l that the magnesium concentration can be reduced to less than 10 mg/l with $Ba(OH)_2$ that high pH water can be stabilized with $CO_2$ and to get an estimate of the running costs of the process The following laboratory experiment was conducted:

EXAMPLE 1

Materials & Methods

Feedstock

Mine waters from a coal mine and a gold mine were used as feed waters containing between 2 400 and 4 800 mg/l sulphate (for chemical analyses, see Tables 1 and 2). Magnesium hydroxide and barium hydroxide were used for pH adjustment and sulphate removal, respectively. $CO_2$ gas (obtained locally from Afrox Ltd) was used for pH adjustment after sulphate removal.

Equipment

Neutralization studies with $Mg(OH)_2$ and sulphate removal with $Ba(OH)_2$ were studied using stirred beakers.

Experimental Procedure

Feed water was mixed in a beaker (5 l), aerated for iron(II) oxidation and stirred for 30 min for completion of the oxidation/precipitation reactions. The sludge was allowed to settle and the clear water decanted. $Ba(OH)_2$ was mixed with the decant water (1000 ml glass beakers). Stabilization of the $Ba(OH)_2$ treated water was achieved by passing $CO_2$ through the water.

Experimental Program

The following parameters were investigated:
Metal removal with $Mg(OH)_2$.
Magnesium and sulphate removal with $Ba(OH)_2$.
Calcium removal with $CO_2$.

Analytical

Samples were collected regularly and filtered (Whatman No 1 filter paper). Sulphate, alkalinity, Fe(II), mixed liquor suspended solids (MLSS), volatile suspended solids (VSS), acidity, and pH determinations were carried out according to procedures described in *Standard Methods* (APHA, 1989). Calcium and magnesium were assayed using atomic absorption spectrophotometry.

Results & Discussion

Water Quality and Chemical Reactions

It is concluded that the process of the invention can be used for the treatment of acid mine drainage (AMD). Tables 1 and 2 show the chemical composition of the feed waters before and after treatment with $Mg(OH)_2$, $Ba(OH)_2$ and $CO_2$ for effluents from coal and gold mines, respectively. The Total Dissolved Solids (TDS) content in the case of coal mine water was lowered from 3 758 mg/l in the feed water to 3 710 mg/l after $Mg(OH)_2$ treatment, to 1 831 mg/l after $Ba(OH)_2$ treatment and to 244 mg/l after $CO_2$ addition (Table 1). Similarly, in the case of gold mine effluent, the overall TDS content was reduced from 6 340 mg/l in the feed water to 355 mg/l after treatment in accordance with the process of the invention (Table 2). During $Mg(OH)_2$ treatment, free acid and all the metal, excluding calcium and magnesium, concentrations were reduced to low levels. The lowering of the TDS in the case of $Mg(OH)_2$ treatment was mainly due to the oxidation of $Fe^{2+}$ to $Fe^{3+}$ (Reaction 9) and precipitation as $Fe(OH)_3$ (Reaction 10). Similarly, $Mn^{2+}$ was oxidised to Me and precipitated as $MnO_2$. The other metals: $Al^{3+}$, $Co^{2+}$, $Zn^{2+}$, $Pb^{2+}$, $Co^{2+}$ and $Ni^{2+}$ precipitated as metal hydroxides. This was owing to the low solubility-products (units) for $Fe(OH)_3$ ($2.64 \times 10^{-39}$); $Al(OH)_3$ ($8.5 \times 10^{-23}$); $Mn(OH)_2$ ($2.06 \times 10^{-13}$); $Cu(OH)_2$ ($2.20 \times 10^{-20}$); $Zn(OH)_2$ ($7.71 \times 10^{-17}$); $Pb(OH)_2$ ($1.42 \times 10^{-20}$); $Co(OH)_2$ ($1.09 \times 10^{-15}$) and $Ni(OH)_2$ ($5.47 \times 10^{-16}$).

In the case of coal mine effluent (Table 1), the Mg concentration increased from 147 mg/l to 243 mg/l during $Mg(OH)_2$ treatment (Reaction 11). The $SO_4^{2-}$-concentration remained constant during $Mg(OH)_2$ treatment due to the high solubility of $MgSO_4$ of 26 g/l.

During the subsequent, $Ba(OH)_2$ treatment, $Mg^{2+}$ was removed to less than 10 mg/l (Reaction 13) at pH 12. The $SO_4^{2-}$ was lowered from 2 680 mg/l to 704 mg/l due to $BaSO_4$ precipitation (Reaction 14), representing a $Ba(OH)_2.8H_2O/SO_4$ removed ratio of 1.009 mole/mole. The precipitated $BaSO_4$ and $Mg(OH)_2$ can be settled rapidly by dosing coagulants. Coagulant dosing can be avoided by controlling the precipitation process to yield particles with improved settling rates. It is known that a multiple point in-line dosing system can produce flocs within the range 10-100 μm.

In the final step, the calcium in the feed water was reduced from 578-80 mg/l (as Ca) by stabilizing the water with $CO_2$ (Reaction 15). During $CO_2$ addition for pH adjustment, $CaCO_3$ crystallization occurred, as indicated by the decrease in the calcium concentration. The saturation, under-saturation and super-saturation states of $CaCO_3$ are theoretically identified by the activity product of $Ca^{2+}$ and $CO_3^{2-}$ species that is comparable with the solubility product constant, $k_{sp}$, for $CaCO_3$. Above the solubility product, $CaCO_3$ will precipitate from solution and below, $CaCO_3$ will dissolve. The rate of precipitation or dissolution is described by Equation (16), where k is the precipitation rate constant, S the surface area of $CaCO_3$ growth/dissolution sites and the activity in mol/l. The rate of precipitation depends on k, S and the term within the brackets { }. Although k is affected to an unknown extent by crystal structure, S is dependent on the size, mass and structure of the crystals. By controlling S and the degree of supersaturation (term in { } brackets), the rate of precipitation or dissolution of $CaCO_3$ can be determined.

In the case of gold mine effluent (Table 2) the Mg concentration increased from 147 mg/l to 718 mg/l during $Mg(OH)_2$ treatment (Reaction 11). The $SO_4^{2-}$-concentration remained constant during $Mg(OH)_2$ treatment due to the high solubility of $MgSO_4$ of 26 g/l. During the subsequent, $Ba(OH)_2$ treatment at pH 12, $Mg^{2+}$ concentration was lowered to 1 mg/L (Reaction 13). The $SO_4^{2-}$ was lowered from 4 398 mg/l to 24 mg/l due to $BaSO_4$ precipitation (Reaction 14), representing a $Ba(OH)_2 \cdot 8H_2O/SO_4$-removed ratio of 0.985 mole/mole. Stabilisation with $CO_2$ resulted in lowering of calcium concentration from 578 to 80 mg/l (as Ca).

$$2Fe^{2+} + \tfrac{1}{2}O_2 + 2H^+ \rightarrow 2Fe^{3+} + H_2O \qquad (9)$$

$$2Fe^{3+} + 6H_2O \rightarrow 2Fe(OH)_3 + 6H^+ \qquad (10)$$

$$6H^+ + 3Mg(OH)_2 \rightarrow 3Mg^{2+} + 6H_2O \qquad (11)$$

$$2Fe^{2+} + \tfrac{1}{2}O_2 + 2H^+ + 3Mg(OH)_2 \rightarrow 2Fe(OH)_3 + 3Mg^{2+} + H_2O \qquad (12)$$

$$Mg^{2+} + Ba(OH)_2 \rightarrow Mg(OH)_2 + Ba^{2+} \qquad (13)$$

$$SO_4^{2-} + Ba^{2+} \rightarrow BaSO_4 \qquad (14)$$

$$Ca(OH)_2 + CO_2 \rightarrow CaCO_3 + H_2O \qquad (15)$$

$$-d[Ca^{2+}]/dt = kS\{(Ca^{2+})^{1/2}(CO_3^{2-})^{1/2} - k_{sp}^{1/2}\}^2 \qquad (16)$$

A benefit of using $Mg(OH)_2$ for neutralization and metal removal is that the precipitated metal hydroxides/oxides are not mixed with gypsum. The sludge from the $Mg(OH)_2$ stage consists of $Fe(OH)_3$, $Al(OH)_3$, $MnO_2$ and $Zn(OH)_2$. The $Ba(OH)_2$ sludge consisted of 70% $BaSO_4$ and 30% $Mg(OH)_2$.

Running Cost

The running cost of the process according to the invention, on the scale described, amounted to R1.61/m³ for treatment of coal mine effluent and R2.71/m³ for goldmine effluent (Table 2). The value of water and by-products recoverable amounted to R6.00/m³ for coal mine effluent and R6.00/m³ for gold mine effluent.

TABLE 1

Chemical composition of feed and treated water when coal mine effluent was treated with $Mg(OH)_2$, $Ba(OH)_2$ and $CO_2$ in accordance with the invention.

| Parameter | Feed | Stage $Mg(OH)_2$ | $Ba(OH)_2 \cdot 8H_2O$ | $CO_2$ |
|---|---|---|---|---|
| Dosage (g/l) | | 0.25 | 6.55 | |
| $Mg(OH)_2$-utilization (mole/mole) | | 1.025 | | |
| Barium-dosage/SO4 removed (mole/mole) | | | 1.009 | |
| pH | 3.4 | 8.3 | 11.9 | 7.5 |
| Sulphate (mg/l SO4) | 2 690 | 2 680 | 704 | 24 |
| Chloride (mg/l Cl) | 35 | 37 | 33 | 31 |
| Alkalinity (mg/l CaCO3) | | 20 | 1 050 | 220 |
| Acidity (mg/l CaCO3) | 100 | | | |
| Sodium (mg/l Na) | 31 | 32 | 30 | 28 |
| Potassium (mg/l K) | 3 | 3 | 3 | 3 |
| Magnesium (mg/l Mg) | 147 | 243 | 7 | 2 |

TABLE 1-continued

Chemical composition of feed and treated water when coal mine effluent was treated with $Mg(OH)_2$, $Ba(OH)_2$ and $CO_2$ in accordance with the invention.

| Parameter | Feed | Stage $Mg(OH)_2$ | $Ba(OH)_2 \cdot 8H_2O$ | $CO_2$ |
|---|---|---|---|---|
| Calcium (mg/l Ca) | 698 | 702 | 695 | 80 |
| Barium (mg/l Ba) | | | | |
| Manganese (mg/l Mn) | 9.2 | 5.1 | 0.1 | 0.2 |
| Iron(II) (mg/l Fe) | 100 | 0 | 0 | 0 |
| Iron(III) (mg/l Fe) | 20 | 0 | 0 | 0 |
| Zinc (mg/l Zn) | 11 | 0 | 0 | 0 |
| Nickel (mg/l Ni) | 1 | 0 | 0 | 0 |
| Cobalt (mg/l Co) | 1 | 0 | 0 | 0 |
| Aluminum (mg/l Al) | 10 | 1 | 2 | 1 |
| Total dissolved solids (mg/l) | 3758 | 3710 | 1831 | 244 |
| $Fe(OH)_3$ (mg/l) | | 230 | | |
| $Mn(OH)_2$ (mg/l) | | 7 | 8 | |
| $Zn(OH)_2$ (mg/l) | | 17 | | |
| $Ni(OH)_2$ (mg/l) | | 2 | | |
| $Co(OH)_2$ (mg/l) | | 2 | | |
| $Al(OH)_3$ (mg/l) | | 26 | | |
| $BaSO_4$ (mg/l) | | | 4,796 | |
| $Mg(OH)_2$ (mg/l) | | | 565 | |
| $CaCO_3$ (mg/l) | | | | 1,537 |
| Suspended solids (mg/l) | 0 | 282 | 5,369 | 1,537 |
| Cations (−) (meq/l) | 57.03 | 57.28 | 36.60 | 5.77 |
| Anions (+) (meq/l) | 56.93 | 56.86 | 36.96 | 5.57 |

TABLE 2

Chemical composition of feed and treated water when gold mine effluent was treated with $Mg(OH)_2$, $Ba(OH)_2$ and $CO_2$ in accordance with the invention.

| Parameter | Feed | Stage $Mg(OH)_2$ | $Ba(OH)_2 \cdot 8H_2O$ | $CO_2$ |
|---|---|---|---|---|
| Dosage (g/l) | | 1.38 | 14.16 | |
| $Mg(OH)_2$-utilization (mole/mole) | | 0.985 | | |
| Barium-dosage/SO4 removed (mole/mole) | | | 0.985 | |
| pH | 2.5 | 8.6 | 12.2 | 7.7 |
| Sulphate (mg/l SO4) | 4 424 | 4 398 | 24 | 11 |
| Chloride (mg/l Cl) | 37 | 37 | 37 | 37 |
| Alkalinity (mg/l CaCO3) | | 20 | 1,607 | 369 |
| Acidity (mg/l CaCO3) | 500 | | | |
| Sodium (mg/l Na) | 96 | 96 | 96 | 96 |
| Potassium (mg/l K) | 3 | 3 | 3 | 3 |
| Magnesium (mg/l Mg) | 147 | 718 | 1 | 2 |
| Calcium (mg/l Ca) | 569 | 572 | 578 | 80 |
| Barium (mg/l Ba) | | | | |
| Manganese (mg/l Mn) | 75 | 19 | 0.2 | 0.2 |
| Iron(II) (mg/l Fe) | 920 | 0 | 0 | 0 |
| Iron(III) (mg/l Fe) | 20 | 0 | 0 | 0 |
| Zinc (mg/l Zn) | 11 | 0 | 0 | 0 |
| Nickel (mg/l Ni) | 13 | 0 | 0 | 0 |
| Cobalt (mg/l Co) | 5 | 0 | 0 | 0 |
| Aluminum (mg/l Al) | 10 | 1 | 2 | 1 |
| Total dissolved solids (mg/l) | 6 340 | 5 850 | 1 288 | 355 |
| $Fe(OH)_3$ (mg/l) | | 1 798 | | |
| $Mn(OH)_2$ (mg/l) | | 91 | 30 | |
| $Zn(OH)_2$ (mg/l) | | 17 | | |
| $Ni(OH)_2$ (mg/l) | | 21 | | |
| $Co(OH)_2$ (mg/l) | | 8 | | |

TABLE 2-continued

Chemical composition of feed and treated water when gold mine effluent was treated with Mg(OH)$_2$, Ba(OH)$_2$ and CO$_2$ in accordance with the invention.

| | | Stage | | |
|---|---|---|---|---|
| Parameter | Feed | Mg(OH)$_2$ | Ba(OH)$_2$·8H$_2$O | CO$_2$ |
| Al(OH)$_3$ (mg/l) | | 26 | | |
| BaSO$_4$ (mg/l) | | | 10 616 | |
| Mg(OH)$_2$ (mg/l) | | | 1 720 | |
| CaCO$_3$ (mg/l) | | | | 1 245 |
| Suspended solids (mg/l) | 0 | 1 960 | 12 366 | 1 245 |
| Cations (−) (meq/l) | 93.21 | 93.07 | 33.67 | 8.63 |
| Anions (+) (meq/l) | 93.60 | 92.74 | 33.48 | 8.53 |

TABLE 3

Running costs of the process according to the invention, and value of the products (water, sulphur and calcium carbonate and magnesium hydroxide)

| | Coal mine | Gold mine |
|---|---|---|
| Item | Cost (R/m$^3$) | Cost (R/m$^3$) |
| Feed sulphate (mg/l) | 2,680.00 | 4,398.00 |
| Treated sulphate (mg/l) | 704.00 | 24.00 |
| BaSO$_4$ production (kg/m$^3$) | 4.80 | 10.62 |
| Barium losses (%) | 5.00 | 5.00 |
| BaSO$_4$ purity (%) | 93.00 | 93.00 |
| BaSO$_4$ required (kg/m$^3$) | 0.26 | 0.57 |
| BaSO$_4$ price (R/t) | 2,500.00 | 2,500.00 |
| BaSO$_4$ cost (R/m$^3$) | 0.64 | 1.43 |
| Carbon content of coal (%) | 70.00 | 70.00 |
| C:BaSO$_4$-ratio | 3.00 | 3.00 |
| Coal required (kg/m$^3$) | 1.06 | 2.34 |
| Coal price (R/t) | 250.00 | 250.00 |
| Coal cost (R/m$^3$) | 0.26 | 0.59 |
| Sulphur production (citric acid, KOH) (R/m$^3$) | 0.20 | 0.20 |
| Energy requirement (kWh/m$^3$) | 1.00 | 1.00 |
| Electricity cost (R/kWh) | 0.30 | 0.30 |
| Energy cost (R/m$^3$) | 0.30 | 0.30 |
| Labour | 0.20 | 0.20 |
| TOTAL RUNNING COST | 1.61 | 2.71 |
| Products | Value (R/m$^3$) | Value (R/m$^3$) |
| Water value | 3.00 | 3.00 |
| Sulphur (kg/m$^3$) | 0.66 | 1.46 |
| Sulphur value (90% recovery, R800/t) (R/m$^3$) | 0.47 | 1.05 |
| CaCO$_3$ (kg/m$^3$) | 1.54 | 1.24 |
| CaCO$_3$ value (90% recovery, R1500/t) (R/m$^3$) | 2.07 | 1.68 |
| Mg(OH)$_2$ (kg/m$^3$) | 0.35 | 0.35 |
| Mg(OH)2 value (70% recovery, R1600/t) (R/m$^3$) | 0.40 | 0.40 |
| TOTAL VALUE OF BY-PRODUCTS | 5.94 | 6.12 |

Note:
Potential value of metals not included

It was thus demonstrated with the process of the invention, that:

1. Mg(OH)$_2$ precipitated all metals as metal hydroxides or metal oxides. Iron(II) was first oxidised to iron(III) before it was precipitated.
2. Ba(OH)$_2$ reacted rapidly with dissolved sulphate, and simultaneously precipitated sulphate as BaSO$_4$ and magnesium as Mg(OH)$_2$. Sulphate removal was stoichiometrically equal to the Ba(OH)$_2$ dosage.
3. CO$_2$ precipitated calcium as CaCO$_3$.
4. The running cost of the barium sulphide process for the removal of 2000 mg/l of sulphate totaled R2.12/m$^3$.
5. Lime pre-treatment for pre-removal of Mg$^{2+}$ or NH$^{4+}$ was not required.

As hereinbefore set out, mining is a significant contributor to water pollution, due primarily to pyrite oxidation that generates potentially high levels of acidity, metals, and sulphate in accordance with reaction (1):

South Africa's Witwatersrand Basin produces 340 Ml/d of mine water, of which 50 Ml/d is produced by the Western Basin. All the underground mining operations in the Western Basin were closed by 1990. By 2004 the underground voids were filled by rising water levels and acid water started to decant at the surface. Contaminated void spaces increase with time and result in: (a) less water suitable for irrigation of crops, (b) less potable water available for local, growing communities, (c) the natural drying up of rivers and (d) stream bed losses. The water of mining origin in the Western Basin contains on average 4 800 mg/l sulphate, 800 mg/l iron(II), 100 mg/l iron(III), 230 mg/l manganese, 11 mg/l zinc, 18 mg/l nickel, 5 mg/l cobalt, 6 mg/l aluminium, 150 mg/l magnesium, some radioactivity and 700 mg/l free acid (as CaCO$_3$). This acid water source creates the following concerns: (i) The Cradle of Humankind, World Heritage Site is close to the decant point. (ii) Acid mine drainage (AMD) will flow into the Krugersdorp Nature Reserve and possibly even the Sterkfontein Cave system which includes the Cradle of Humankind, where the earliest known hominid fossil remains were discovered and where palaeontological excavations continue.

It is essential that a technically sound and cost-effective solution be found for the acid mine water problem. South Africa is water constrained and also has a mature mining economy with numerous mines having closed or are in the process of closing down. Should a technical solution be found that generates income, the acid mine water problem could be solved via economic principles rather than through government intervention via policies and legislated control measures. It is believed that the process of the invention complies with these requirements.

The invention claimed is:

1. A process for treating acid mine drainage containing dissolved metals, dissolved calcium, and dissolved sulphates, which process includes
   in a first treatment stage, adding magnesium hydroxide to the acid mine drainage, for neutralization of the acid mine drainage and for reaction with dissolved metals in the acid mine drainage, thereby to cause the metals to be precipitated as metal hydroxides or metal oxides;
   removing precipitated metal hydroxides and metal oxides from the acid mine drainage;
   thereafter, in a second treatment stage, adding barium hydroxide to the acid mine drainage, with the barium hydroxide reacting with dissolved sulphates in the acid mine drainage to produce barium sulphate which precipitates out, and with dissolved magnesium to produce magnesium hydroxide;
   removing precipitated barium sulphate from the acid mine drainage as a sludge;
   treating the sludge so as to convert the barium sulphate to barium hydroxide via barium sulphide by reacting the barium sulphate with coal in accordance with reaction (2)

$$BaSO_4 + 2C \rightarrow BaS + 2CO_2 \qquad (2)$$

thereafter reacting the barium sulphide with steam under pressure, in accordance with reaction (3)

$$BaS+H_2O \rightarrow BaO+H_2S \quad (3)$$

and thereafter reacting the barium oxide with water, in accordance with reaction (4)

$$BaO+H_2O \rightarrow Ba(OH)_2 \quad (4)$$

wherein reaction (2) is effected in a kiln, and wherein the mole ratio of C:BaSO$_4$ is about 1:3 to cater for heat that is required in reaction (2) which is endothermic;

removing precipitated magnesium hydroxide from the acid mine drainage;

recycling the precipitated magnesium hydroxide to the first treatment stage;

in a third treatment stage, adding carbon dioxide to the acid mine drainage, with the carbon dioxide reacting with dissolved calcium in the acid mine drainage, to cause the calcium to be precipitated as calcium carbonate; and removing the precipitated calcium carbonate from the acid mine drainage.

2. A process according to claim 1, wherein the acid mine drainage contains, in addition to iron (II) as a dissolved metal, also iron (III), manganese, zinc, nickel, cobalt, aluminium and/or magnesium as dissolved metal(s).

3. A process according to claim 2, wherein oxidation treatment is also effected in the first treatment stage, for oxidation of iron (II) to iron (III).

4. A process according to claim 1, wherein the precipitated barium sulphate and magnesium hydroxide that are formed in the second treatment stage are removed from the water simultaneously as a sludge, with the sludge being treated to separate the magnesium hydroxide from the barium sulphate.

5. A process according to claim 1, wherein, in the second treatment stage, the precipitated barium sulphate and magnesium hydroxide are allowed to grow to different sizes, with precipitated barium sulphate being removed or recovered separately from the precipitated magnesium hydroxide, using the particle size differences of the two precipitated compounds.

6. A process according to claim 1, wherein reaction (3) is carried out by adding the steam to the kiln, with reaction (3) being carried out at 950° C. to 1050° C., with the steam being introduced into the kiln below a point where air that is required for reaction (2) is introduced into the kiln, and with the hydrogen sulphide produced in accordance with reaction (3) leaving the kiln, together with other off-gases produced, at an upper end of the kiln.

7. A process according to claim 6, which includes converting the hydrogen sulphide produced in accordance with reaction (3) to a sulphur-containing by product.

8. A process according to claim 7, wherein the conversion of the hydrogen sulphide includes contacting the off gases containing the hydrogen sulphide with sodium hydroxide in accordance with reaction (7):

$$NaOH+H_2S \rightarrow NaHS+H_2O \quad (7).$$

9. A process
for treating acid mine drainage containing dissolved metals, dissolved calcium, and dissolved sulphates, which process includes in a first treatment stage, adding magnesium hydroxide to the acid mine drainage, for neutralization of the acid mine drainage and for reaction with dissolved metals in the acid mine drainage, thereby to cause the metals to be precipitated as metal hydroxides or metal oxides;

removing precipitated metal hydroxides and metal oxides from the acid mine drainage;

thereafter, in a second treatment stage, adding barium hydroxide to the acid mine drainage, with the barium hydroxide reacting with dissolved sulphates in the acid mine drainage to produce barium sulphate which precipitates out, and with dissolved magnesium to produce magnesium hydroxide;

removing precipitated barium sulphate from the acid mine drainage as a sludge;

treating the sludge so as to convert the barium sulphate to barium hydroxide via barium sulphide by converting coal to coke in accordance with reaction (6)

$$Coal \rightarrow C+CO_2+ash+volatiles+tar \quad (6)$$

reacting the barium sulphate with the resultant coke (C+ash) in accordance with reaction (2)

$$BaSO_4+coke \rightarrow BaS+2CO_2 \quad (2)$$

thereafter reacting the barium sulphide with steam under pressure, in accordance with reaction (3)

$$BaS+H_2O \rightarrow BaO+H_2S \quad (3)$$

and thereafter reacting the barium oxide with water, in accordance with reaction (4)

$$BaO+H_2O \rightarrow Ba(OH)_2 \quad (4)$$

wherein reaction (2) is effected in a kiln, and wherein the mole ratio of C:BaSO$_4$ is about 1:3 to cater for heat that is required in reaction (2) which is endothermic;

removing precipitated magnesium hydroxide from the acid mine drainage;

recycling the precipitated magnesium hydroxide to the first treatment stage;

in a third treatment stage, adding carbon dioxide to the acid mine drainage, with the carbon dioxide reacting with dissolved calcium in the acid mine drainage, to cause the calcium to be precipitated as calcium carbonate; and removing the precipitated calcium carbonate from the acid mine drainage.

10. A process according to claim 9, wherein reaction (6) is carried out in the same kiln as that in which reaction (2) is carried out.

11. A process according to claim 10, wherein reaction (3) is carried out by adding the steam to the kiln, with reaction (3) being carried out at 950° C. to 1050° C., with the steam being introduced into the kiln below a point where air that is required for reaction (2) is introduced into the kiln, and with the hydrogen sulphide produced in accordance with reaction (3) leaving the kiln, together with other off-gases produced, at an upper end of the kiln.

12. A process according to claim 11, which includes converting the hydrogen sulphide produced in accordance with reaction (3) to a sulphur-containing by product.

13. A process according to claim 12, wherein the conversion of the hydrogen sulphide includes contacting the off gases containing the hydrogen sulphide with sodium hydroxide in accordance with reaction (7):

$$NaOH+H_2S \rightarrow NaHS+H_2O \quad (7).$$

* * * * *